May 7, 1929.  F. M. SQUIRE  1,712,011
ELECTRICAL CONDENSER
Filed March 5, 1928
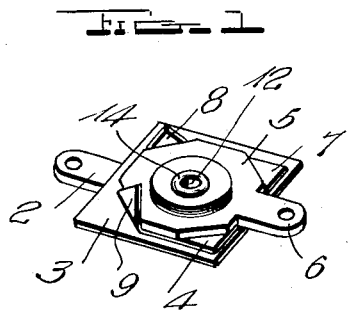
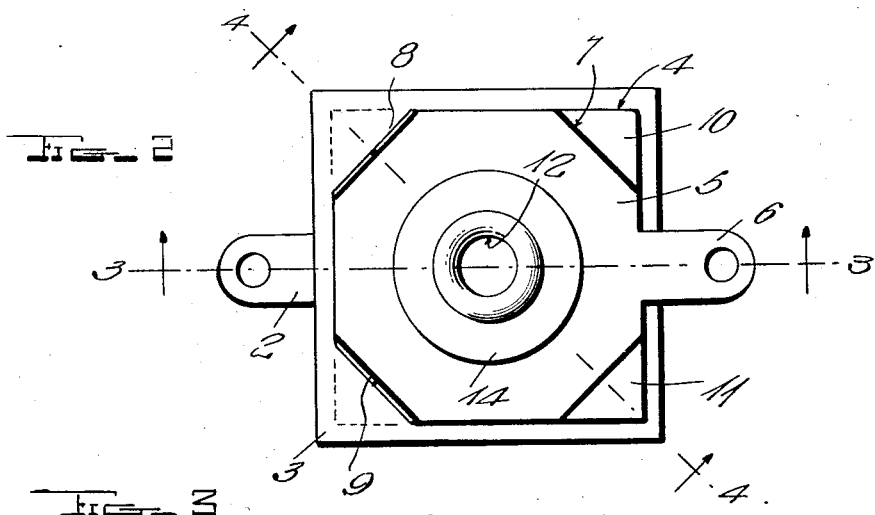
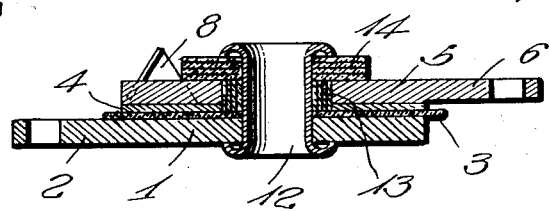
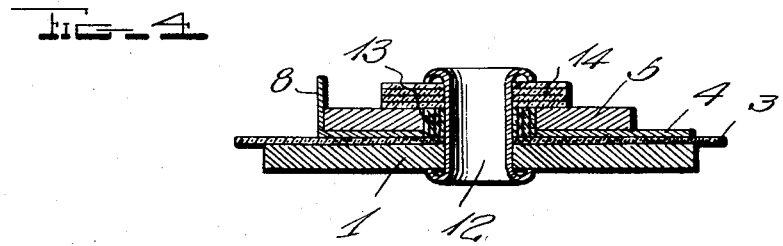
INVENTOR.
Frank M. Squire,
BY John O. Brady
ATTORNEY Patented May 7, 1929.

1,712,011

UNITED STATES PATENT OFFICE.

FRANK M. SQUIRE, OF HOLLIS, NEW YORK, ASSIGNOR TO BRANDES LABORATORIES, INC., A CORPORATION OF NEW JERSEY.

ELECTRICAL CONDENSER.

Application filed March 5, 1928. Serial No. 259,252.

My invention relates broadly to electrical condensers and more particularly to a condenser of the adjustable capacity type.

One of the objects of my invention is to provide a construction of electrical condenser which may be manufactured on a quantity production scale where the tolerance in capacity value is necessarily small and where sufficient adjustability is available to permit the capacity to be slightly varied, but yet when once adjusted to remain permanently fixed.

Another object of my invention is to provide an electrical condenser which may be adjusted to a selected capacity value and when once adjusted to remain permanently fixed in the selected adjustment.

Still another object of my invention is to provide a simplified construction of adjustable capacity electrical condenser having a minimum number of parts and being capable of adjustment to a predetermined capacity value and fixed in such adjustment permanently.

Other and further objects of my invention reside in the construction of an electrical condenser described in the following specification and set forth in the accompanying drawing, in which:

Figure 1 is a perspective view of the electrical condenser of my invention; Fig. 2 is an enlarged plan view of the electrical condenser of my invention; Fig. 3 is a longitudinal cross-sectional view taken through the condenser on line 3—3 of Fig. 2; and Fig. 4 is a cross-sectional view taken through a diagonal line 4—4 passing through the condenser illustrated in Fig. 2.

My invention is directed to an electrical condenser, particularly useful as a grid condenser for electron tube circuits where it is desirable to select the capacity required for operation with a particular tube system and thereafter permanently fix the value of that capacity.

In the condenser construction of my invention a pair of flat conductive plates are clamped centrally by means of an eyelet rivet with a readily deformable metallic sheet and an insulated sheet therebetween. One of the conductive plates is substantially octagonal at its periphery permitting the readily deformable sheet to be bent out of plane with respect to one electrode of the condenser for adjusting the capacity of the condenser to a predetermined value, which thereafter may be permanently maintained. This deformable metallic sheet may be bent at one or more of the corners thereof with respect to the octagonal shaped conductive plate of the condenser. The tolerance in grid condensers must be small, and I have found that the adjustment allowed in the construction of the condenser of my invention fulfills all requirements.

Referring to the drawings in more detail, reference character 1 designates the lower conductive plate constituting one side of the electrical condenser system of my invention. A lug 2 projects laterally from the conductive plate 1 for providing a connection to one electrode of the condenser. A sheet of dielectric material 3 extends over the upper surface of the conductive plate 1, and on top of this dielectric sheet 3 I provide a readily deformable metallic sheet 4. A flat end plate member 5 is provided resting in electrical connection with the deformable metallic sheet 4 and having a lug 6 extending therefrom for providing electrical connection to the condenser of opposite potential with respect to the potential of lug 2. The plate 5 is irregular in shape or octagonal at its periphery as represented at 7 enabling the deformable sheet 4 to be bent upwardly at points around the periphery of the plate 5 for varying the capacity of the condenser slightly for obtaining that capacity which may be permanently fixed for a selected value.

In the drawings the deformable sheet 4 has been shown bent upwardly at its corners 8 and 9 while the corners of plate 4 at 10 and 11 are left flat, as shown more clearly in Fig. 1. The ends of the plate 4 extend vertically by overlapping the periphery of the electrode 5 thereby decreasing the capacity of the condenser 5 by the amount of the area which would normally be covered by tongues 8 and 9 extending in a plane parallel to the surface of the lower electrode 1.

The condenser is secured together by means of an eyelet rivet 12 which establishes electrical connection with the lower electrode 1 but is insulated from the deformable sheet 4 and upper electrode 5 by means of insulated gasket member 13 and insulated disc member 14. The eyelet 12 is deformed against the gasket 14 on one side and against the conductive plate 1 on the opposite side.

Connection to the electrical condenser may be made by soldering to lugs 2 and 6 and adjustment of the capacity obtained by slightly bending the ends of the deformable sheet 4 into the upstanding positions illustrated in the drawings for reducing the effective capacity of the condenser to a permanent selected value.

The condenser structure of my invention may be manufactured inexpensively on a quantity production scale and assembled without the requirement of skilled labor.

While I have described the condenser system of my invention in a certain preferred embodiment, I desire that it be understood that modifications may be made and that no limitations upon my invention are intended other than those imposed by the appended claims.

What I claim as new and desire to secure by Letters Patent of the United States is as follows:

1. An electrical condenser comprising a pair of flat metallic plates, a dielectric sheet extending between said plates, a metallic sheet clamped between one of said plates and said dielectric sheet, said last mentioned plate having an irregularly shaped periphery terminating short of the area of said metallic sheet, said metallic sheet being deformable with respect to the peripheral edge of said last mentioned plate for decreasing the electrical exposure of said last mentioned plate with respect to said first mentioned plate, and means for securing said plates in superimposed relation.

2. An electrical condenser comprising a pair of metallic plates, insulation material extending between said plates, a deformable metallic sheet extending between one of said plates and said insulation material, means for securing said plates, insulation material and deformable metallic sheet in superimposed relation, said deformable metallic sheet being changeable in its effective area with respect to the metallic plate on the opposite side of the insulation material for modifying the electrical capacity of said condenser.

3. In an electrical condenser a pair of metallic plates, a dielectric sheet extending therebetween, a conductive sheet of deformable material clamped between one of said plates and the deformable material, said last mentioned plate having an irregularly shaped periphery with respect to the periphery of the other plate, whereby said conductive sheet of deformable material may be bent away from the metallic plate on the opposite side of said dielectric sheet for changing the effective capacity of said condenser.

4. An electrical condenser comprising a pair of flat metallic plates, a dielectric sheet extending between said plates, a flexible metallic sheet overlying said dielectric sheet and extending between said dielectric sheet and one of said flat metallic plates, said last mentioned flat metallic plate having dimensions substantially smaller than the dimensions of the other flat metallic plate, said flexible metallic sheet being bendable away from said first mentioned metallic plate and over the peripheral edge of said second mentioned metallic plate for reducing the electrical exposure between said plates and modifying the capacity of said condenser.

5. An electrical condenser comprising a pair of flat metallic plates, a dielectric sheet extending between said plates, a flexible metallic sheet overlying said dielectric sheet and extending between said dielectric sheet and one of said flat metallic plates, said last mentioned flat metallic plate having a substantially octagonal shaped peripheral edge while said first mentioned metallic plate has a substantially rectangular peripheral edge, said flexible metallic sheet being bendable away from said first mentioned metallic plate and over the peripheral edge of said second mentioned metallic plate for reducing the electrical exposure between said plates and modifying the capacity of said condenser.

In testimony whereof I affix my signature.

FRANK M. SQUIRE.